(12) United States Patent
Kennington

(10) Patent No.: US 11,137,341 B2
(45) Date of Patent: Oct. 5, 2021

(54) SYSTEM AND METHOD FOR SEPARATION GAS DETECTION BETWEEN SAMPLES

(71) Applicant: Essen Instruments, Inc., Ann Arbor, MI (US)

(72) Inventor: Aaron Bryce Kennington, Albuquerque, NM (US)

(73) Assignee: Essen Instruments, Inc., Ann Arbor, MI (US)

( * ) Notice: Subject to any disclaimer, the term of this patent is extended or adjusted under 35 U.S.C. 154(b) by 0 days.

(21) Appl. No.: 16/544,842

(22) Filed: Aug. 19, 2019

(65) Prior Publication Data
US 2019/0369002 A1    Dec. 5, 2019

Related U.S. Application Data

(63) Continuation-in-part of application No. 15/616,168, filed on Jun. 7, 2017, now Pat. No. 10,416,067.

(Continued)

(51) Int. Cl.
*G01N 15/14* (2006.01)
*G01N 21/53* (2006.01)
(Continued)

(52) U.S. Cl.
CPC ..... *G01N 15/1436* (2013.01); *G01N 15/1404* (2013.01); *G01N 15/1459* (2013.01);
(Continued)

(58) Field of Classification Search
CPC ..... G01N 2001/4066; G01N 2001/387; G01N 2001/2267; G01N 2291/02433;
(Continued)

(56) References Cited

U.S. PATENT DOCUMENTS 3,768,084 A * 10/1973 Haynes .............. G01N 15/1227
377/12
5,825,487 A * 10/1998 Felbinger ........... G01N 15/1404
356/338

(Continued)

FOREIGN PATENT DOCUMENTS

GB    1407764 A    9/1975
GB    2099575 A  * 12/1982  ............. G01N 35/08
(Continued)

OTHER PUBLICATIONS

International Search Report for PCT/US2017/036317, dated Oct. 25, 2017.

*Primary Examiner* — Dominic J Bologna
(74) *Attorney, Agent, or Firm* — McDonnell Boehnen Hulbert & Berghoff LLP

(57) ABSTRACT

A flow cytometer apparatus is provided herein including (a) a flow cell, (b) a fluidic pathway having a second end coupled to a first end of the flow cell, (c) a probe coupled to a first end of the fluidic pathway, (d) a sensor configured to detect one or more properties of a fluid in the fluidic pathway and positioned between the probe and the first end of the flow cell, (e) a processor in communication with the sensor, and (f) a non-transitory computer readable medium having stored therein instructions that are executable to cause the processor to perform functions including: (i) receiving, via the processor, the one or more properties of the fluid in the fluidic pathway detected by the sensor, and (ii) determining, based on the detected one or more properties of the fluid in the fluidic pathway, a presence of a separation gas in the fluid in the fluidic pathway.

26 Claims, 12 Drawing Sheets

Related U.S. Application Data

(60) Provisional application No. 62/346,739, filed on Jun. 7, 2016.

(51) Int. Cl.
    *G01N 35/08* (2006.01)
    *G01N 21/64* (2006.01)
    *G01N 15/10* (2006.01)

(52) U.S. Cl.
    CPC .......... *G01N 21/53* (2013.01); *G01N 21/6486* (2013.01); *G01N 35/08* (2013.01); *G01N 2015/1006* (2013.01)

(58) Field of Classification Search
    CPC ... G01N 2035/1018; G01N 2015/0011; G01N 15/1436; G01N 15/1404
    See application file for complete search history.

(56) References Cited

U.S. PATENT DOCUMENTS

| | | |
|---|---|---|
| 6,878,556 B2 | 4/2005 | Sklar et al. |
| 6,890,487 B1 | 5/2005 | Sklar et al. |
| 7,368,084 B2 | 5/2008 | Sklar et al. |
| 7,842,244 B2 | 11/2010 | Sklar et al. |
| 8,021,872 B2 | 9/2011 | Sklar et al. |
| 8,268,571 B2 | 9/2012 | Sklar et al. |
| 8,976,352 B2 | 3/2015 | Muraki et al. |
| 9,476,101 B2 | 10/2016 | Pregibon et al. |
| 9,551,644 B2 | 1/2017 | Kennington et al. |
| 9,797,917 B2 | 10/2017 | Barnes et al. |
| 10,041,884 B2 | 8/2018 | Fujioka et al. |
| 10,302,533 B2 | 5/2019 | Maillart et al. |
| 10,416,067 B2* | 9/2019 | Kennington ........... G01N 35/08 |
| 2002/0170365 A1* | 11/2002 | Sklar ................. G01N 15/1459 73/865.5 |
| 2004/0065143 A1 | 4/2004 | Husher |
| 2005/0162648 A1 | 7/2005 | Auer et al. |
| 2010/0197512 A1 | 8/2010 | Trinkle et al. |
| 2012/0061584 A1 | 3/2012 | Trinkle et al. |
| 2012/0309635 A1 | 12/2012 | Trinkle et al. |
| 2013/0210672 A1 | 8/2013 | Sklar et al. |
| 2014/0005537 A1 | 1/2014 | Asami et al. |
| 2015/0346075 A1 | 12/2015 | Andreev et al. |
| 2017/0067805 A1* | 3/2017 | Maillart .................... G01N 1/38 |
| 2017/0356838 A1* | 12/2017 | Knollenberg ...... G01N 15/1459 |
| 2018/0075299 A1* | 3/2018 | Gerber .............. G06K 9/00624 |
| 2018/0253034 A1 | 9/2018 | Doshida et al. |

FOREIGN PATENT DOCUMENTS

| | | |
|---|---|---|
| GB | 2099575 A | 12/1982 |
| JP | H02176543 A | 7/1990 |
| JP | 2007225335 A | 9/2007 |

* cited by examiner

SYSTEM AND METHOD FOR SEPARATION GAS DETECTION BETWEEN SAMPLES

RELATED APPLICATIONS

This Application is a continuation-in-part of U.S. application Ser. No. 15/616,168 entitled "Method for air bubble detection between samples using flow cytometry forward scatter waveform analysis," filed on Jun. 7, 2017, and further claims the benefit of priority to U.S. Provisional Application No. 62/346,739 entitled "Method for air bubble detection between samples using flow cytometry forward scatter waveform analysis," filed on Jun. 7, 2016, the contents of both of which are hereby incorporated by reference in their entirety.

BACKGROUND

High-throughput flow cytometry systems use a pump system to fill a sample tubing line with a stream of discrete sample particle suspensions aspirated from wells of a microplate and separated one from the other by air bubble gaps. The entire sample stream is continuously delivered to the flow cytometer so that data from all the samples in the microplate are acquired and stored in a single data file. A high resolution time parameter is also recorded during data acquisition. Temporal gaps in particle detection are created in the data stream by the passage of the air gaps, allowing the individual particle suspensions to be distinguished and separately evaluated when plotted in conjunction with the time parameter. Based on this temporal distribution, data peaks are identified and assigned to individual wells of the microplate. However, in many cases, these temporal distributions are not sufficient to accurately identify individual sample wells, and identification errors sometimes occur.

SUMMARY

Methods and systems for detecting air bubbles in a continuous fluidic stream of samples separated by air bubbles are disclosed herein. In one example, the scatter waveform output of the scatter detector of the flow cytometer is used to detect the air bubbles.

Some embodiments of the present disclosure provide a method for: generating, with a scatter detector, a voltage output signal as a flow stream comprising a plurality of samples, each sample separated by a separation gas, passes through a flow cytometer for a period of time; sampling the voltage output signal; and recording a timestamp and a voltage value for each sampled voltage of the voltage output signal that is greater than a separation gap threshold. The method may further include the steps of: prior to the generating step, moving the plurality of samples comprising particles into the flow stream; inserting the separation gas between adjacent ones of said plurality of samples to separate said samples from each other in said flow stream, said flow stream thereby constituting a gas-separated sample flow stream; guiding said fluid-separated sample flow stream including the separated samples and the separation fluid to and through the flow cytometer; and continuously operating the flow cytometer to focus the gas-separated flow stream and to detect scattered light by the scatter detector as the fluid flow stream passes through the flow cytometer. In further embodiments, the method may include the step of: prior to the moving step, obtaining a plurality of samples from a plate having a plurality of sample wells, wherein each sample of the plurality of samples is obtained from a respective well of the plurality of wells.

Embodiments of the present disclosure further include a non-transitory computer readable medium having stored therein instructions that are executable to cause a processor to perform the methods described herein.

Further embodiments of the present disclosure include a system comprising: a flow cytometer comprising a scatter detector; a processor in communication with the output of the scatter detector; and a non-transitory computer readable medium having stored therein instructions that are executable to cause the processor to perform the methods described herein.

DETAILED DESCRIPTION

Figure 1A:
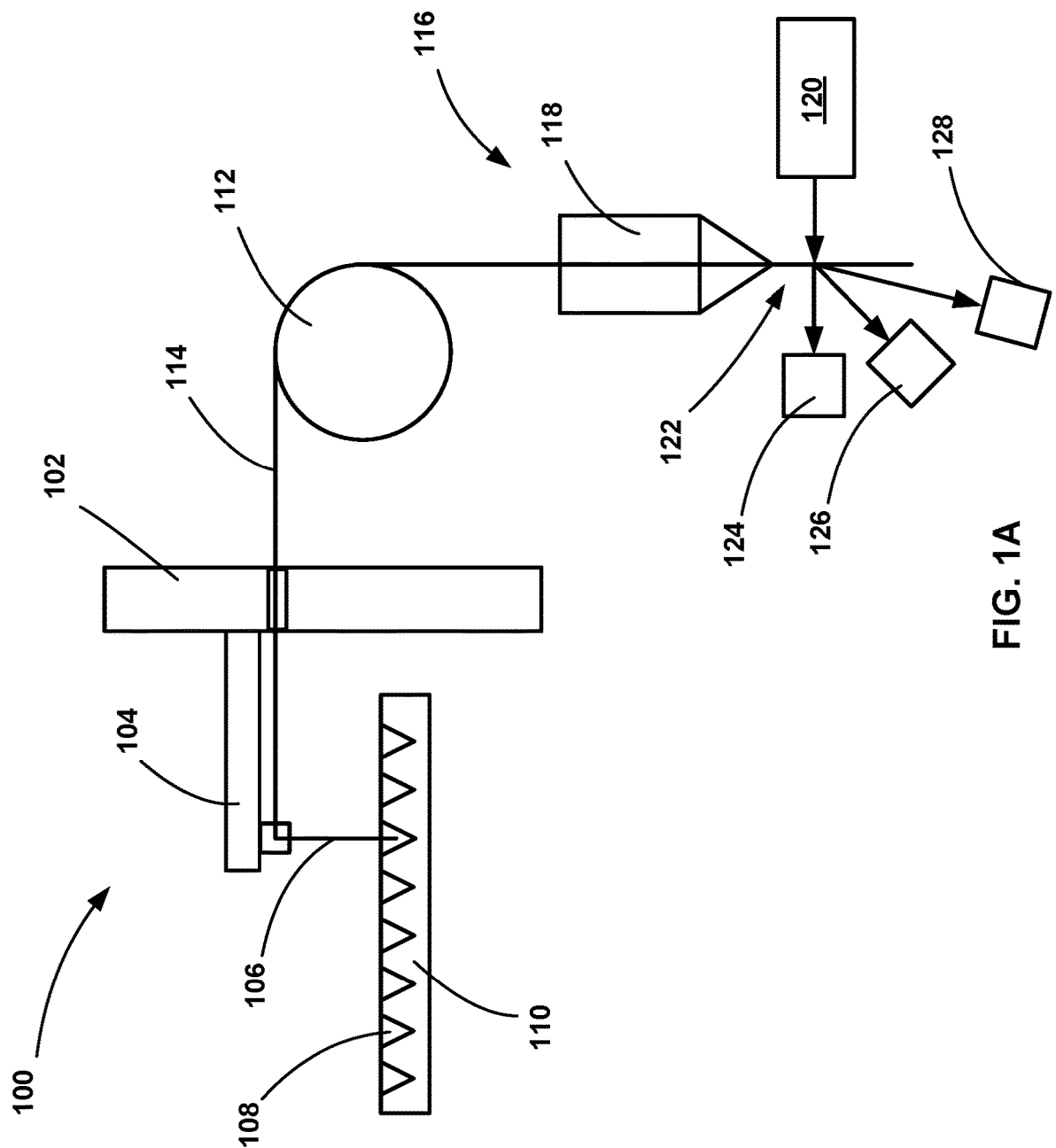
FIG. 1A is a schematic view of a flow cytometry apparatus.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to." Words using the singular or plural number also include the plural and singular number, respectively.

The description of embodiments of the disclosure/examples is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All embodiments of any aspect of the invention can be used in combination, unless the context clearly dictates otherwise.

For the purposes of the present invention, the term "sample" as used herein refers to any quantity of liquid which may contain particles of interest or marker particles that are detectable by a particle analyzer. More specifically a sample may include a fluid solution or suspension containing particles of interest or marker particles to be detected and/or analyzed using a method and/or apparatus disclosed herein. The particles of interest in a sample may be tagged, such as with a fluorescent tag. The particles of interest may also be bound to a bead, a receptor, or other useful protein or polypeptide, or may just be present as free particles, such as particles found naturally in a cell lysate, purified particles from a cell lysate, particles from a tissue culture, etc. The sample may include chemicals, either organic or inorganic, used to produce a reaction with the particles of interest. When the particles of interest are biomaterials, drugs may be added to the samples to cause a reaction or response in the biomaterial particles. The chemicals, drugs or other additives may be added to and mixed with the samples when the samples are in sample source wells or the chemicals, drugs or other additives may be added to the samples in the fluid flow stream after the samples have been uptaken by the autosampler.

As used herein, the term "biomaterial" refers to any organic material obtained from an organism, either living or dead. The term "biomaterial" also refers to any synthesized biological material such as synthesized oligonucleotides, synthesized polypeptides, etc. The synthesized biological material may be a synthetic version of a naturally occurring biological material or a non-naturally occurring biological made from portions of naturally occurring biological materials, such as a fusion protein, or two biological materials that have been bound together, such as an oligonucleotide, such as DNA or RNA, bound to a peptide, either covalently or noncovalently, that the oligonucleotide does not normally bind to in nature.

As used herein, the term "oligonucleotide" refers to any oligonucleotide, including double and single-stranded DNA, RNA, PNAs (peptide nucleic acids) and any sequence of nucleic acids, either natural or synthetic, derivatized or underivatized.

As used herein, "peptide" refers to all types of peptides and conjugated peptides including: peptides, proteins, polypeptides, protein sequences, amino acid sequences, denatured proteins, antigens, oncogenes and portions of oncogenes.

As used herein, the term "organism" refers not only to animals, plants, bacteria, viruses, etc. but also to cell cultures, reproduced oligonucleotides, etc. made from organic material obtained from animals, plants, bacteria, viruses, etc.

As used herein, the term "drug" refers to any type of substance that is commonly considered a drug. A drug may be a substance that acts on the central nervous system of an individual, e.g. a narcotic, hallucinogen, barbiturate, or a psychotropic drug. For the purposes of the present invention, a drug may also be a substance that kills or inactivates disease-causing infectious organisms. In addition, a drug may be a substance that affects the activity of a specific cell, bodily organ or function. A drug may be an organic or inorganic chemical, a biomaterial, etc.

As used herein, an "aliquot" is a sip of a sample taken from a well via a probe of a flow cytometer.

As used herein, the term "conduit" refers to device such as a tube, channel, etc. through which a fluid stream flows. A conduit may be composed of several separate devices, such as a number of connected or joined pieces of tubing or a single piece of tubing, alone or in combination with channels or other different devices. In various embodiments, a conduit may include any tube that may be used with a peristaltic pump that has compression characteristics that allow a peristaltic pump to move samples separated by a separation gas or aliquots of marker particles through the tube at a speed of at least 6 samples per minute without causing adjacent samples to mix with each other.

As used herein "marker particles" may include control particles, beads or micro beads and further refers to one or more particles detectable by a flow cytometer system (for example, a system as described in U.S. Pat. No. 6,878,556 and WO2010005617) that may uptake from a sample container an aliquot of a sample suspected of having therein particles of interest to be analysed.

For the purposes of the present invention, the term "particles" as used herein refers to small objects that may be present in a sample and detected using a flow cytometry apparatus, including, but not limited to biological particles, such as molecules, cells, proteins, protein aggregates, cellular components such as nuclei, and mitochondrion, organisms, including microbes and viruses, microspheres, microbeads, and synthetic particles, such as chemical compounds and chemical aggregates, etc.

For the purposes of the present invention, the term "sample" refers to a fluid solution or suspension which may contain particles of interest.

For the purposes of the present invention, the term "well" as used herein refers to any structure which contains a sample to be analysed, a control or an aliquot of marker particles.

For the purposes of the present invention, the terms "plate," "microplate," and "microtiter plate" as used herein refer to a structure which contains a sample to be analysed, a control, or an aliquot of marker particles.

For the purposes of the present invention, the term "about" means +/−5% of the recited parameter.

For the purposes of the present invention, the term "detector" refers to any detector capable of detecting scattered light, including photomultiplier tubes (PMTs) and single-photon avalanche diodes (SPADs).

For the purposes of the present invention, the term "separation gas" refers to any gas such as air, an inert gas, or fluid etc. that can be used to form a gas bubble or immiscible fluid between adjacent samples or between a sample and a buffer fluid. An immiscible fluid is a fluid that will not substantially mix with and contaminate a sample.

For the purposes of the present invention, the term "adjacent samples" refers to two samples in a fluid flow stream that are separated from each other only by a separation gas, such as an air bubble.

For the purposes of the present invention, the term "flow cytometer" includes any flow cytometry apparatus, including, but not limited to, the flow cytometers are described in U.S. Pat. Nos. 5,895,764; 5,824,269; 5,395,588; 4,661,913; the entire contents and disclosures of which are hereby incorporated by reference. In the flow cytometer, samples may be sorted on a particle by particle basis using known methods.

As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present disclosure describes a novel system and method for detecting air bubbles in a continuous fluidic stream of samples separated by air bubbles using the scatter waveform output of the flow cytometer detector.

FIG. 1A illustrates an exemplary flow cytometry apparatus 100 for use in connection with the present invention. Flow cytometry apparatus 100 includes a conventional autosampler 102 having an adjustable arm 101 on which is mounted a hollow probe 106. As arm 104 moves back and forth (left and right in FIG. 1A) and side to side (into and out of the plane of FIG. 1A), probe 106 is lowered into individual source wells 108 of a well plate 110 to obtain a sample comprising particles (which may be tagged with a fluorescent tag (not shown in FIG. 1A)) to be analyzed using flow cytometry apparatus 100. In between in-taking sample material from each of source wells 108, probe 106 is allowed to intake aliquots of a separation fluid (such as air), thereby forming a separation bubble between successive samples in the fluid flow stream.

Once a sample is picked up by probe 106, it is introduced into a fluid flow stream and a peristaltic pump 112 forces the sample through a conduit 114 that extends from autosampler 102 through peristaltic pump 112 and into a flow cytometer 116 including a flow cell 118 and a laser interrogation device 120. The flow cell 118 may be continuously operated to focus the fluid flow stream and to analyze the particles in each of the plurality of samples as the fluid flow stream passes through the flow cytometer. Laser interrogation device 120 examines individual samples flowing from flow cell 118 at a laser interrogation point 122.

Figure 1B:
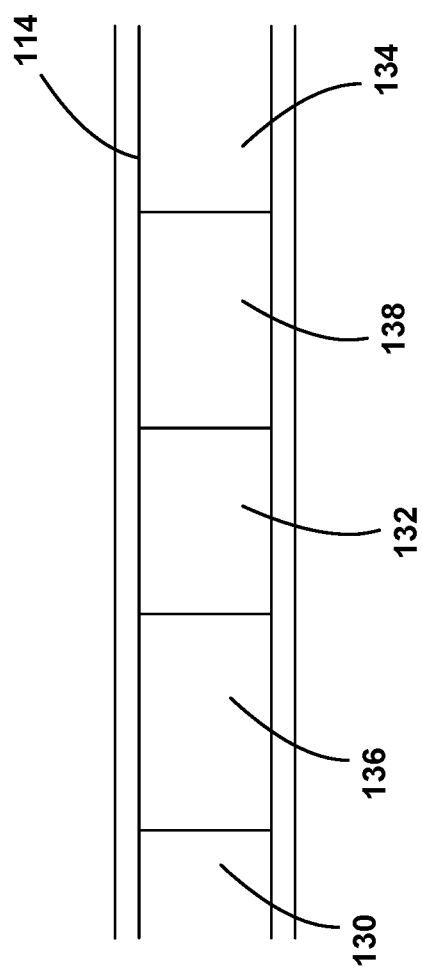
FIG. 1B is a cross-sectional schematic view of immediately adjacent samples in a conduit of the flow cytometry apparatus of FIG. 1A.

FIG. 1B illustrates series of samples 130, 132 and 134 separated from each other by separation bubbles 136 and 138 in conduit 114, forming a bubble-separated fluid flow stream. In FIG. 1B, sample 130 is immediately adjacent to sample 132, and sample 132 is immediately adjacent to sample 134. When samples 130, 132 and 134 pass through laser interrogation point 122, the particles in the samples are sensed by flow cytometer 116. Forward scattered light is detected by a forward scatter detector 124. Fluorescence emitted from tagged particles in the flow cell is detected by a fluorescence detector 126. Side scattered light is detected by a side scatter detector 128. In contrast, when air bubbles 136 and 138 pass through laser interrogation point 122, no particles are sensed. Therefore, a graph of the data points of fluorescence sensed versus time for a series of samples analyzed using a flow cytometer will form distinct groups, each aligned with the time that a sample containing particles passes through the laser interrogation point. Such graphs can be generated by the output of both the forward scatter detector 124, the fluorescence detector 126, and/or the side scatter detector 128.

Correctly identifying the sample well from which each sample was taken is important in analysis and use of the flow cytometer output data. In some high-throughput flow cytometry system methods, the sampling protocol, including parameters such as the probe sip time (the duration that the probe is in a well), probe up time (the amount of time the probe pauses out of a well to draw in air), multiwell shakes and rinse steps, the sampling order, as well as the height of event peaks and the spacing between them, are used to segment the data file for an entire microtiter plate into individual well data. However, even with utilizing these elements, well identification errors still occur.

Figure 2:
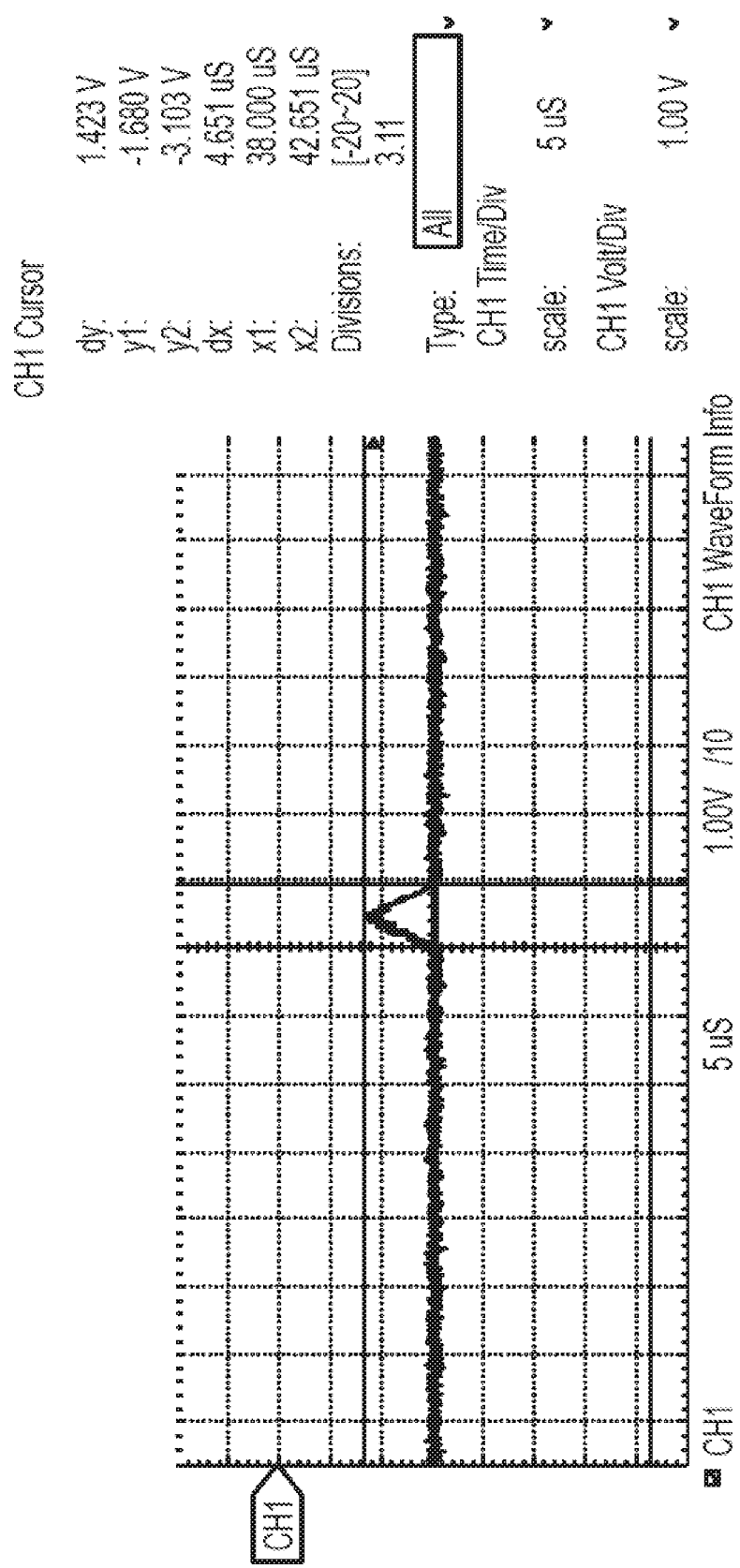
FIG. 2 illustrates an example plot of a sample event waveform output from a forward scatter detector.

In one embodiment of the present invention, the detection of separation bubble gaps is used in the accurate identification of individual sample wells. This may, in some cases, be used in addition or alternatively to the parameters already used. Separation bubble gaps are identified by analyzing the voltage output signal generated by a scatter detector, such as forward detector 124 or side scatter detector 128, of the flow cytometer as a flow stream with a plurality of separation-gas separated samples passes through the flow cytometer for a period of time. While the samples, each expected to contain particles of interest, in the flow stream are traveling through the flow cytometer flow cell, each event triggered by a particle generates a fairly consistent scatter waveform pattern having a time duration between about 4 µs and 10 µs and a peak to peak detector voltage output between about 1.4 to 1.6 volts. A sample event waveform obtained via an oscilloscope connected to the forward scatter detector output is shown in FIG. 2.

Figure 3:
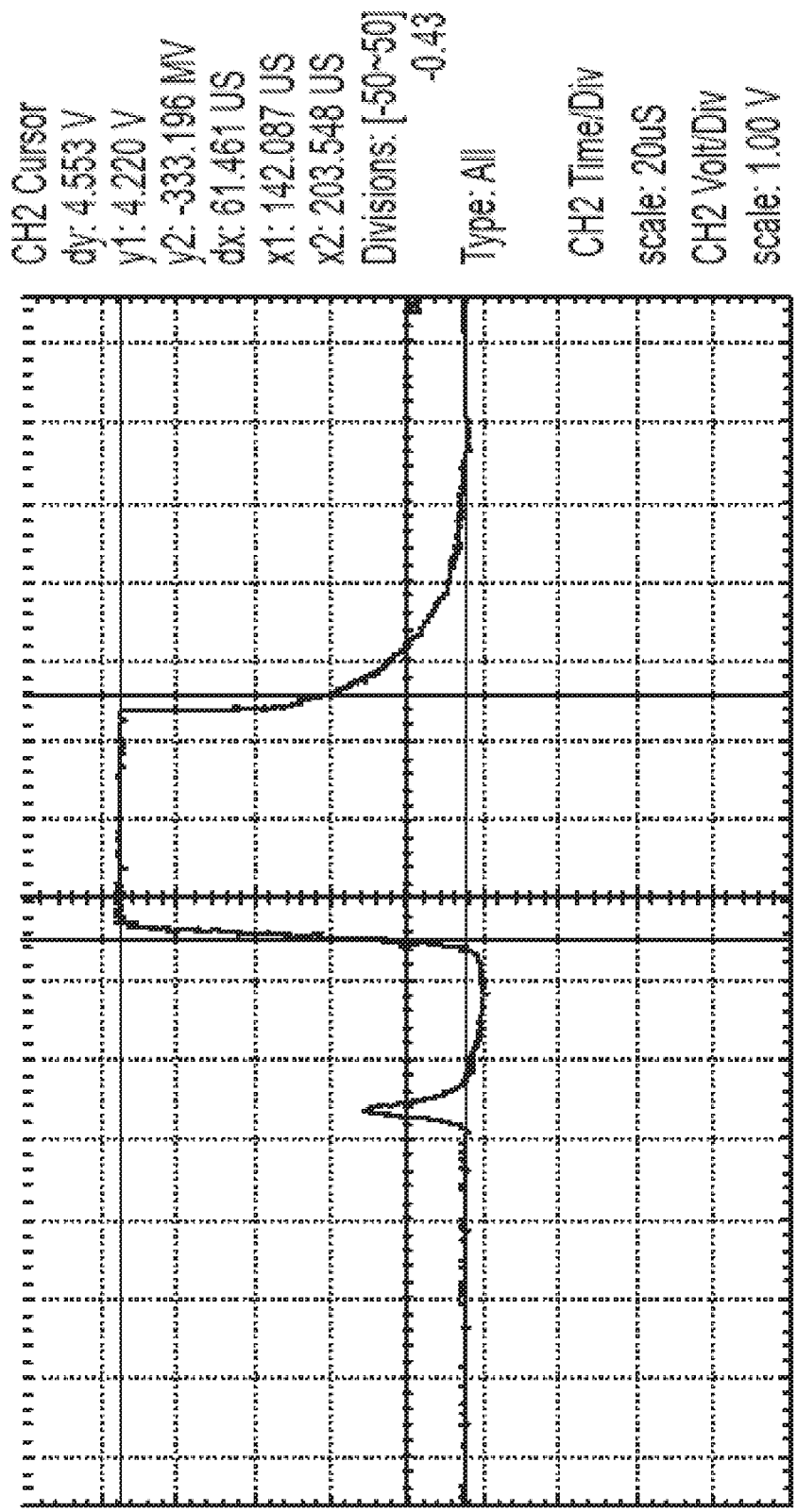
FIG. 3 illustrates an example plot of an air bubble gap waveform output from a forward scatter detector.
Figure 4:
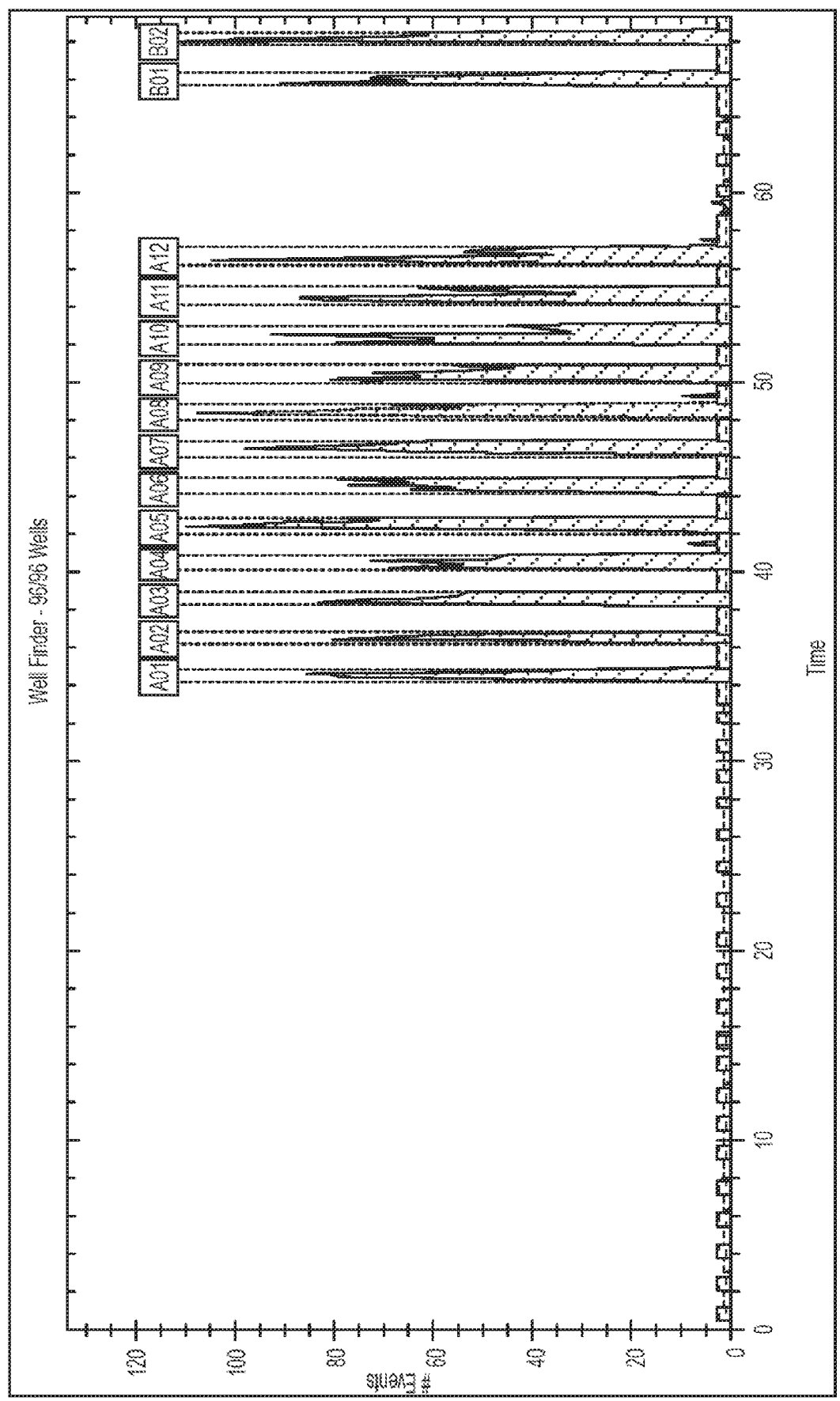
FIG. 4 illustrates an example histogram of sample event data of pre-plate prime air bubbles, the first row A of the sample plate with inter-row shake, and the first two wells of row B of the sample plate, acquired from the flow cytometer plotted with separation gas timing output data acquired from the forward scatter detector of the flow cytometer.

A separation bubble gap following a sample traveling through the flow cytometer flow cell also generates a fairly consistent scatter waveform pattern. The waveform pattern is show in FIG. 3 and has the characteristics of a time duration between 50 µs and 90 µs, which is about seven to nine times greater than a sample event waveform, and a peak to peak detector voltage output that is between about 4.2 to 4.8 volts, which is three times greater than a sample event waveform. As it goes through the flow cell, an air bubble acts as a mirror, reflecting a large portion of the excitation laser light to the forward scatter detector. This intensity of scattered light causes the detector to output a signal with the maximum voltage, as shown in the waveform.

Using these waveforms, a processor, integrated as part of or in communication with the flow cytometer, analyzes the voltage output over time to match one of the follow signal patterns: background (no event measured), an event measured, or an air bubble measured based on the waveforms described above. These patterns can then be used to identify each source well in the data stream.

In particular, the method for detecting a separation gas in a fluid flow stream comprises: (a) generating, with a scatter detector, a scatter voltage output signal indicative of an intensity of scattered light as a flow stream comprising a plurality of samples, each sample separated by a separation gas, passes through a flow cytometer for a period of time, (b) sampling the scatter voltage output signal, and (c) recording a timestamp and a voltage value for each sampled voltage of the scatter voltage output signal that is greater than a separation gap threshold. In one example, each of the plurality of samples is suspected of containing particles of interest. The method may also include comparing each sampled voltage of the scatter voltage output signal to the separation gap threshold.

In operation, the processor samples the voltage output signal of the scatter detector, and records voltage values that are greater than a separation gap threshold. In some examples, each sampled voltage of the voltage output signal is compared to the separation gap threshold. The separation gap threshold has, in some examples, a value at least two times greater than a maximum voltage output of the plurality samples, which can depend on the type of flow cytometer and the electronics of the forward scatter detector. In connection with the experimental data presented below, the maximum voltage capable of detection by the forward scatter detector is 5V and a separation gap threshold of 3.9V was selected (corresponding to (800/1023)*5V). This threshold is more than double the maximum expected sample output of 1.6V from the forward scatter detector. Further, the voltage output signal is sampled at a frequency. In some examples, the sampling frequency is between 5 kHz and 500 kHz. In a further example, the sampling frequency of up to about 10 MHz is used.

The analysis software algorithm, executed by the processor, can consist of two portions, an initial time correlation and an air bubble gap event timing, to delineate individual microplate wells from the continuous flow cytometer data stream. The bubble-gap event timing algorithm may be used in conjunction with other well identification parameters, such as those described above.

As scatter data is collected, a timestamp is recorded at the time that each sampled voltage that is over the threshold occurred. Therefore, the flow cytometry system, or the processor integrated therein or in communication therewith, may also include a clock. This timestamp will be used to correlate detected patterns with the data stream from the flow cytometer. The flow cytometry system may also include, or be in communication with a memory in which the sampled voltage values above the threshold and the timestamps are recorded.

In addition, at the start of a microplate sampling run, before the first microplate well is sampled, a starting time calibration sequence may be performed. In such an example, the method may also include prior to the generating step, moving the plurality of samples comprising particles into the flow stream, inserting the separation gas between adjacent ones of said plurality of samples to separate said samples from each other in said flow stream, said flow stream thereby constituting a gas-separated sample flow stream, guiding said fluid-separated sample flow stream including the separated samples and the separation fluid to and through the flow cytometer, and continuously operating the flow cytometer to focus the gas-separated flow stream and to detect scattered light by the scatter detector as the fluid flow stream passes through the flow cytometer. In such an example, the method may also include prior to the moving step, obtaining a plurality of samples from a plate having a plurality of sample wells, wherein each sample of the plurality of samples is obtained from a respective well of the plurality of wells.

In one particular example, three separation bubble gaps are introduced, each separated by a one second sip of deionized water, and followed by eight seconds of deionized water. When sample event data acquisition begins from the flow cytometer, the bubble-gap detector microprocessor is initiated with a time stamp of zero. With this calibration sequence, the timestamp output of the air bubble gap detector (separation gas timing data) can be correlated with the flow cytometer sample event data timing to synchronize the start of a plate sampling run. In operation, separation gas timing data generated from the captured scatter voltage signal and corresponding timestamp, which is applied when the output of the scatter detector is over the set voltage threshold. This separation gas timing data is synchronized with the sample events data from the flow cytometer based on timing. The separation gas timing data is plotted with the sample events versus time histogram that is used for well identification. Accordingly, the air bubble detection pattern timing output may be used to delineate between well air bubble gaps where microbubbles, debris, insufficient sample, sample preparation error or carryover would make it difficult to do so only using event counts over time.

In one example, the scatter detector comprises a forward scatter detector, as described in addition detail below in relation to FIGS. 4-8. In another example, the scatter detector comprises a side scatter detector as described in additional detail below in relation to FIG. 9. In the embodiment where the scatter detector comprises a forward scatter detector, the method may also include generating, with a side scatter detector, a side scatter voltage output signal indicative of an intensity of side scattered light as the flow stream comprising the plurality of samples, each sample separated by a separation gas, passes through the flow cytometer for the period of time, generating, with a fluorescence detector, a fluorescence voltage output signal indicative of an intensity of fluorescent light emitted as the flow stream comprising the plurality of samples, each sample separated by a separation gas, passes through the flow cytometer for the period of time, and generating sample events data based, at least in part on the forward scatter voltage output signal, side scatter voltage output signal and fluorescence voltage output signal.

Figure 5:
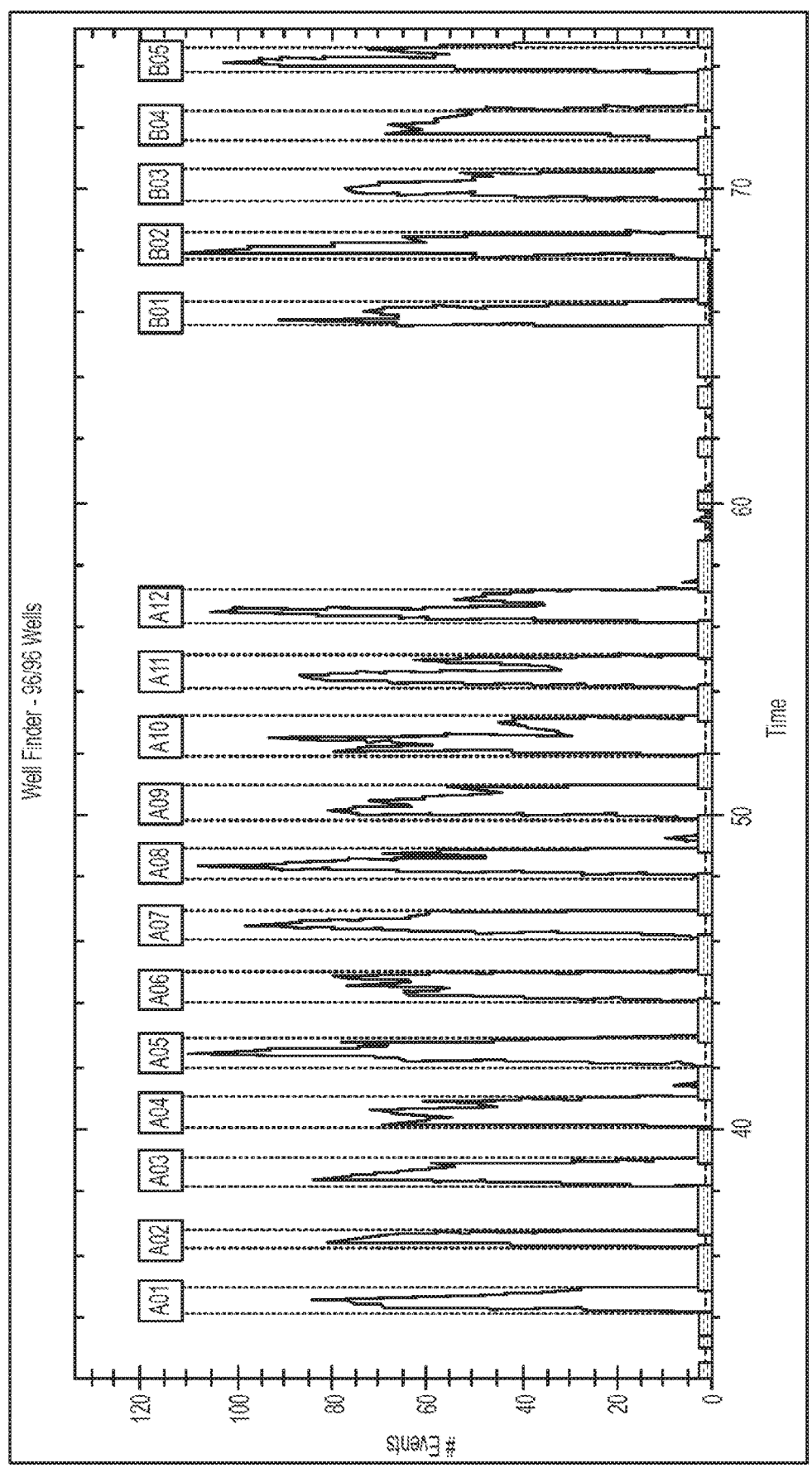
FIG. 5 is a zoomed-in view of a portion of FIG. 4.
Figure 6:
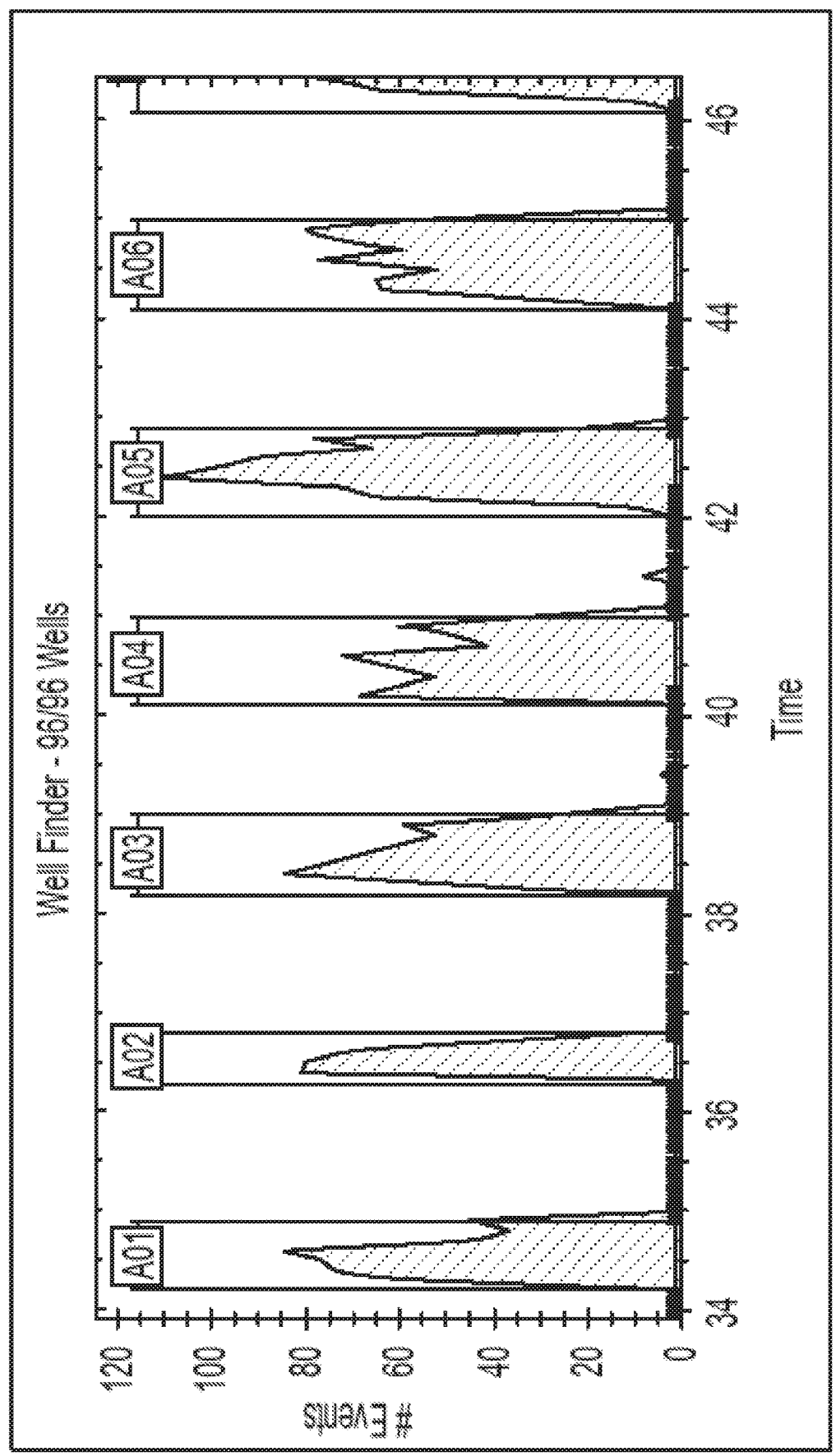
FIG. 6 is a zoomed-in view of a portion of FIG. 4.
Figure 7:
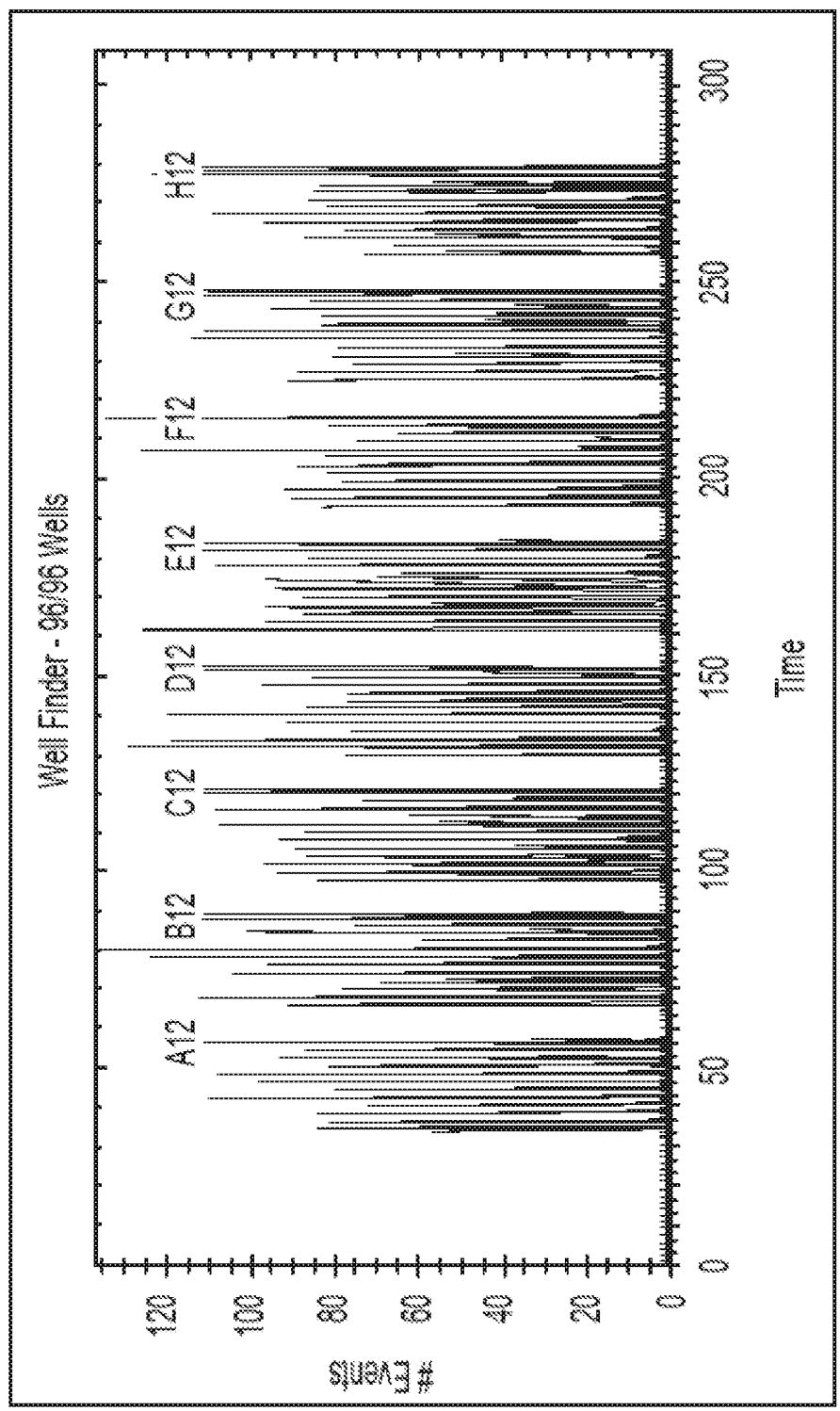
FIG. 7 illustrates an example histogram of sample event data of a full 96-well plate acquired from the flow cytometer plotted with separation gas timing output data acquired from the forward scatter detector of the flow cytometer.

An exemplary air bubble detector of the present invention was tested experimentally by first measuring forward scatter flow cytometer waveforms of both air bubbles and samples and determining a method to distinguish the two types of waveforms. The resulting separation gas timing data is illustrated in FIGS. 4-7, plotted with the sample detection data histogram. The flow cytometer generates sample detection data based on the outputs of the forward scatter, side scatter and fluorescence detectors. The number of wells identified by the well identification algorithm and the total number of wells in a sample plate are shown at the top of the histogram. In these figures, the tall vertical lines on the time histogram correlate to bubbles going through the flow cell and the short vertical lines correlate to the number of events in a sample. The detection of separation bubbles can be seen particularly well in the pre-plate priming sequence shown in FIG. 4, which also illustrates the detector output from sampling of the first row A of the well plate, followed by shaking of the microplate to resuspend any particles in the samples, with inter-row shake, and the detector output from sampling of the first two wells of row B. FIG. 5 is a close-up view of a portion of FIG. 4, specifically, the detector output from sampling of the first row A of the well plate, followed by microplate shaking, and the detector output from sampling of the first two wells of row B. FIG. 6 is also is a close-up view of a portion of FIG. 4, specifically the detector output from sampling of the first six wells of row A of the well plate. FIG. 7 is a histogram of the detector output from a sampled full 96-well plate. Control software for operating a flow cytometry device may, in some cases, allow a user to program a custom sampling protocol, which may include, for example, a set of probe rinses and/or microplate shaking sequences to be performed after a certain number of wells are sampled. In the illustrated examples, a 96 well microplate was sampled row-by-row, with microplate shaking after each row.

The gates, each labelled with a letter and number, in each of FIGS. 4-7 correspond to the respective wells of the well plates identified by the method of the present disclosure. This novel method utilizing the forward scatter output to detect bubble gaps limit well identification errors, as compared to previous methods. The forward scatter waveform analysis described herein, used in conjunction with the sampling protocol, may allow for accurate identification and verification of sampling protocol features, such as row or column plate shaking and probe rinses, as well as the bubble gaps between samples, independent of detection of the samples themselves. In the forward scatter waveform analysis, sequences of detected bubbles are used to delineate the samples, rather than sequences of low event counts between samples. This may eliminate possible errors that can occur where there are sequences of low event counts in a sample due to, for example, sample preparation error, incorrectly dispensed samples, samples with very few particles of interest (e.g., toxicity assays), insufficient re-suspension of the sample, clogging of the fluidic sample tubing. In addition, forward scatter waveform analysis can provide real-time feedback on the consistency of bubble gaps in the flow cell which can be used to detect clogging of the fluidic pathway from sample probe to flow cell.

Figure 8:
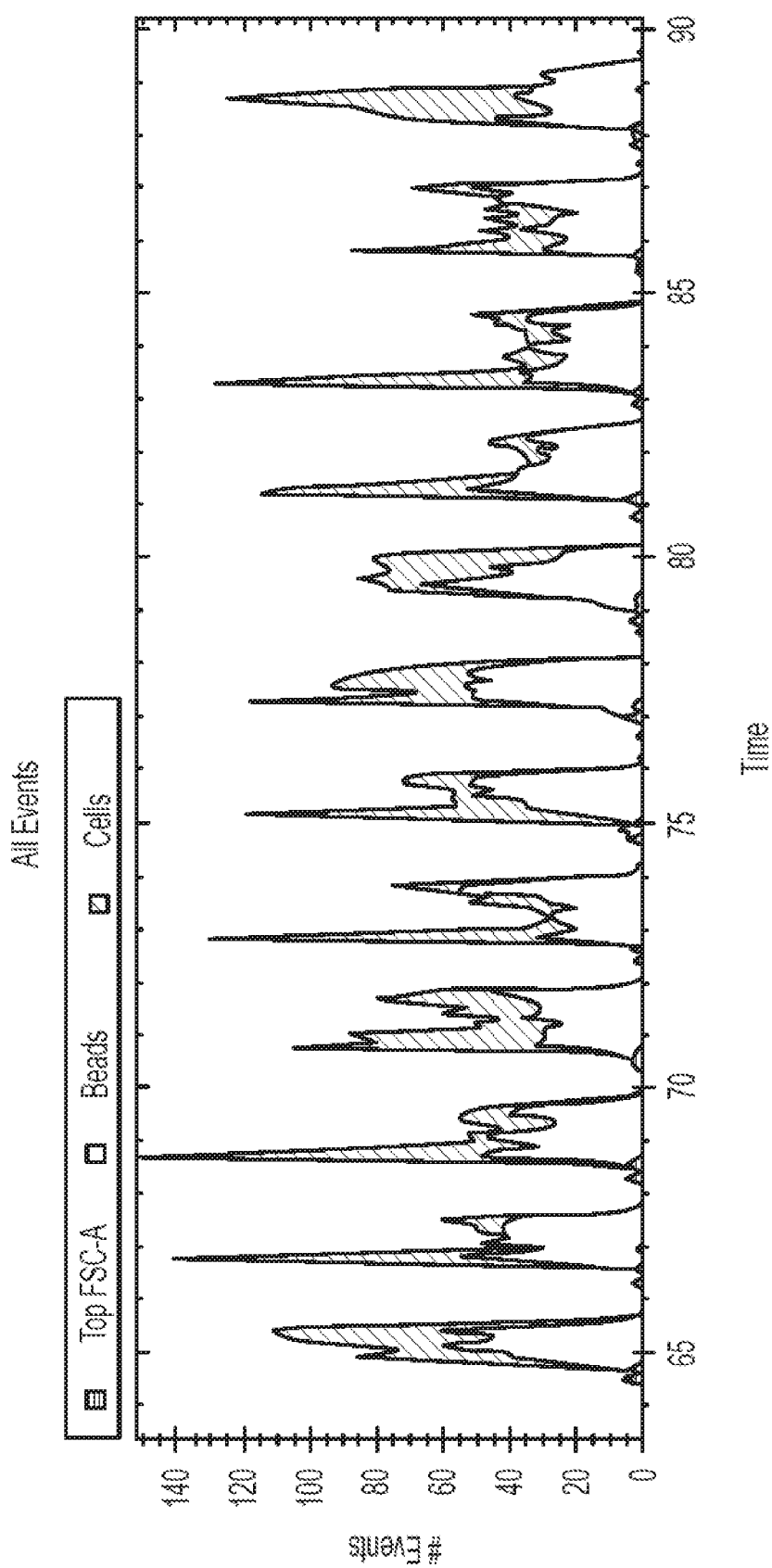
FIG. 8 illustrates an example histogram of sample event data of a processed FSC-A output acquired from the flow cytometer plotted with separation gas timing output data acquired from the forward scatter detector of the flow cytometer.

FIG. 8 illustrates an example histogram of sample event data of a processed FSC-A output acquired from the flow cytometer plotted with separation gas timing output data acquired from the forward scatter detector of the flow cytometer. As such, in the example shown in FIG. 8 the flow cytometer detector itself (not an external device) converts the voltage output from the forward scatter PMT to a processed FSC-A digital output value for each event. The boundary between the separation gas and the liquid sample will cause one or more events with a FSC-A value to be at the top limit of detection (e.g., top value produced by the flow cytometer), thereby forming gates around the top FSC-A event values as shown in FIG. 8. The flow cytometer also records a timestamp for every event recorded. With this information, the separation gas timing data is synchronized with the sample events data from the flow cytometer based on timing. The separation gas timing data is plotted with the sample events versus time histogram that is used for well identification. Accordingly, the air bubble detection pattern timing output may be used to delineate between well air bubble gaps where microbubbles, debris, insufficient sample, sample preparation error or carryover would make it difficult to do so only using event counts over time.

Figure 9:
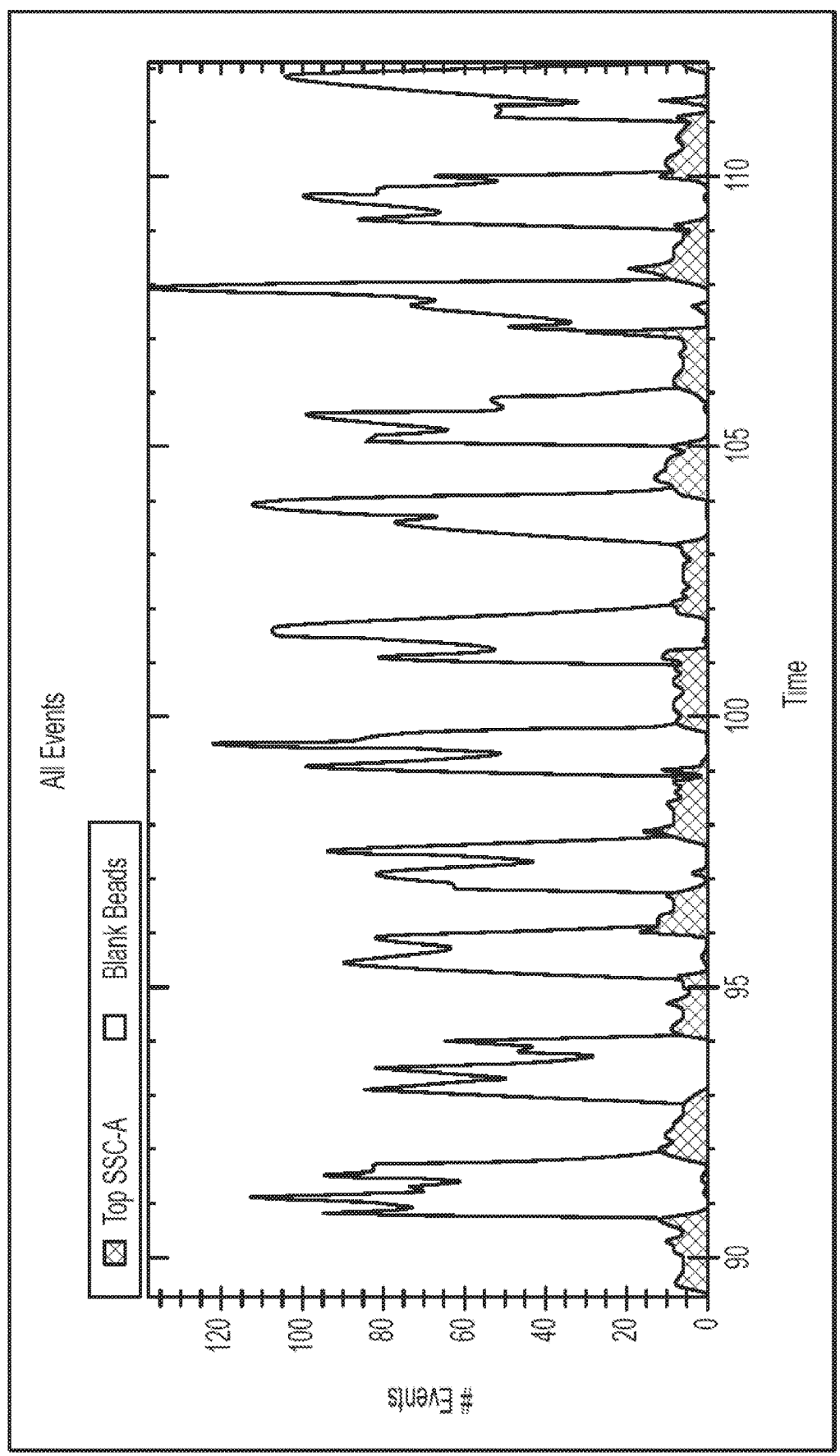
FIG. 9 illustrates an example histogram of sample event data of a processed SSC-A output acquired from the flow cytometer plotted with separation gas timing output data acquired from the side scatter detector of the flow cytometer.

FIG. 9 illustrates an example histogram of sample event data of a processed SSC-A output acquired from the flow cytometer plotted with separation gas timing output data acquired from the side scatter detector of the flow cytometer. In the example shown in FIG. 9, the flow cytometer detector itself (not an external device) converts the voltage output from the side scatter PMT to a processed SSC-A digital output value for each event. The flow cytometer also records a timestamp for every event recorded. With this information, the separation gas timing data is synchronized with the sample events data from the flow cytometer based on timing. The separation gas timing data is plotted with the sample events versus time histogram that is used for well identification.

Figure 10:
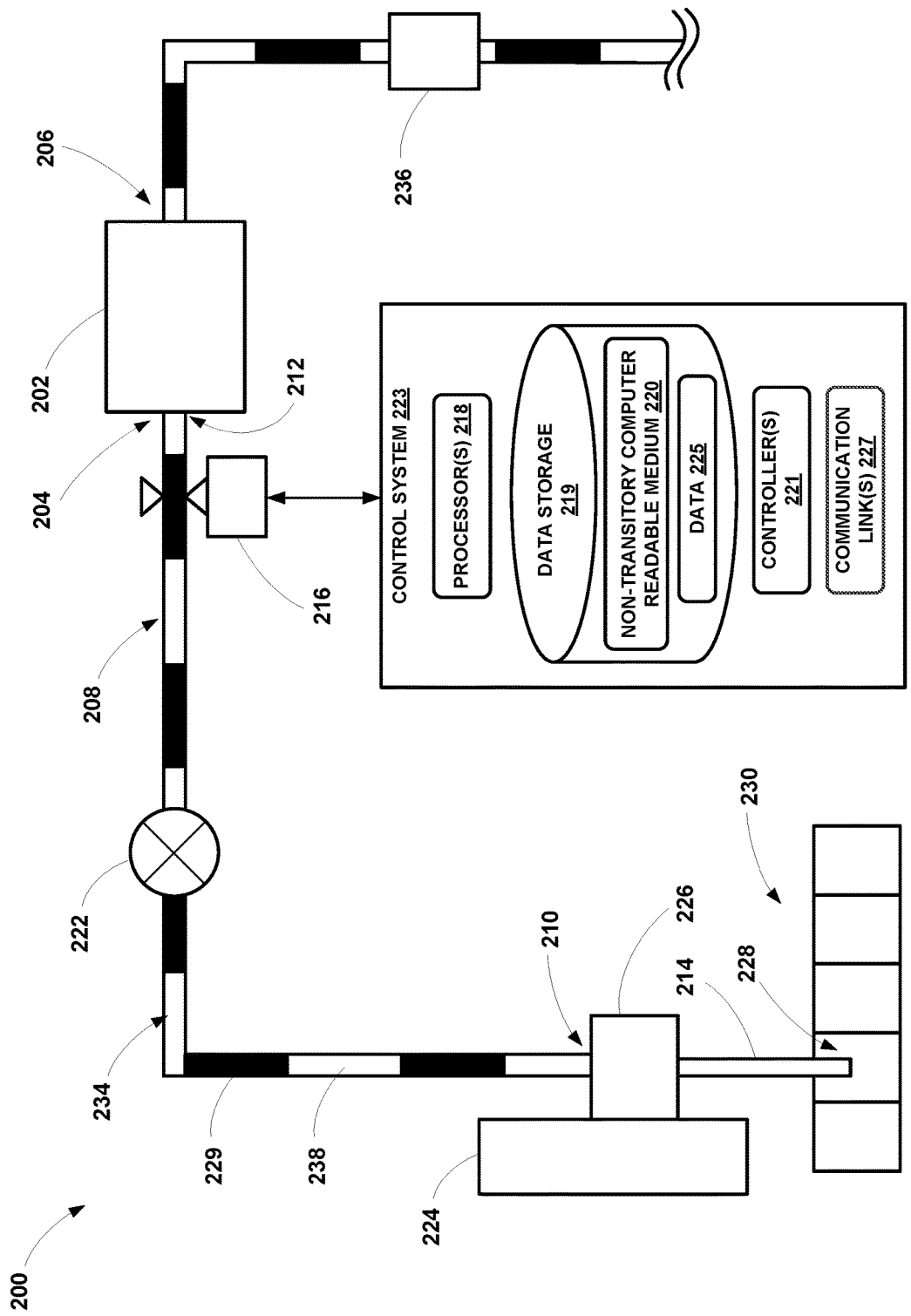
FIG. 10 illustrates is a schematic view of another flow cytometer apparatus.

FIG. 10 illustrates another exemplary flow cytometer apparatus 200 for use in connection with the present invention. In particular, as shown in FIG. 10, the flow cytometer apparatus 200 includes a flow cell 202 having a first end 204 and a second end 206. The flow cytometer apparatus 200 also includes a fluidic pathway 208 having a first end 210 and a second end 212. As shown in FIG. 10, the second end 212 of the fluidic pathway 208 is coupled to the first end 204 of the flow cell 202. The flow cytometer apparatus 200 also includes a probe 214 coupled to the first end 210 of the fluidic pathway 208. As shown in FIG. 10, the flow cytometer apparatus 200 also includes a sensor 216 positioned between the probe 214 and the first end 204 of the flow cell 202. The sensor 216 is configured to detect one or more properties of a fluid in the fluidic pathway 208.

An example probe 214 may include a 0.01 inch ID, $\frac{1}{15}$ inch OD stainless steel needle compatible with HPLC ferrule fittings. In one embodiment, in order to reduce carryover of samples between wells, the probe 214 may have a conical tip. In another embodiment, silicone or other hydrophobic agent may coat the tip of the sampling probe 214 to help minimize sample carryover. In an alternative embodiment, the entire probe 214 may be made of a hydrophobic material to reduce carryover. Suitable hydrophobic materials for use in the coating or for making the entire hydrophobic probe include: Teflon® (poly(tetrafluoroethylene) (PTFE)), Kynar® (polyvinylidene fluoride), Tefzel® (ethylene-tetrafluoroethylene copolymer), tetrafluoroethylene-perfluoroalkyl vinyl ether copolymer resin (PFA), a tetrafluoroethylene-hexafluoropropylene copolymer (EFP), polyether ether ketone (PEEK), etc.

As shown in FIG. 10, the flow cytometer apparatus 200 may include processor(s) 218, data storage 219, and controller(s) 221, which together may be part of a control system 223. Processor(s) 218 may operate as one or more general-purpose hardware processors or special purpose hardware processors (e.g., digital signal processors, application specific integrated circuits, etc.). The processor(s) 218 may be configured to execute non-transitory computer readable medium 220, and manipulate data 225, both of which are stored in the data storage 219. The processor(s) 218 may also directly or indirectly interact with other components of the flow cytometer apparatus 200, such as the sensor 216 and/or communication links 227 as non-limiting examples.

The data storage 219 may be one or more types of hardware memory. For example, the data storage 219 may include or take the form of one or more computer-readable storage media that can be read or accessed by processor(s) 218. The one or more computer-readable storage media can include volatile and/or non-volatile storage components, such as optical, magnetic, organic, or another type of memory or storage, which can be integrated in whole or in part with processor(s) 218. In some implementations, the data storage 219 can be a single physical device. In other implementations, the data storage 219 can be implemented using two or more physical devices, which may communicate with one another via wired or wireless communication. As noted previously, the data storage 219 may include the non-transitory computer readable medium 220 and the data 225. The data 225 may be any type of data from the flow cytometer apparatus 200, such as configuration data, sensor data, and/or diagnostic data, among other possibilities.

The controller 221 may include one or more electrical circuits, units of digital logic, computer chips, and/or microprocessors that are configured to (perhaps among other tasks), interface between any combination of the various components of the flow cytometer apparatus 200. In some implementations, the controller 221 may be a purpose-built embedded device for performing specific operations with one or more subsystems of the flow cytometer apparatus 200.

The control system 223 may monitor and physically change the operating conditions of the flow cytometer apparatus 200. In doing so, the control system 223 may serve as a link between portions of the flow cytometer apparatus 200. In some instances, the control system 223 may serve as an interface between the flow cytometer apparatus 200 and another computing device. Further, the control system 223 may serve as an interface between the flow cytometer apparatus 200 and a user.

In some implementations, the control system 223 of the flow cytometer apparatus 200 may also include communication link(s) 227 configured to send and/or receive information. The communication link(s) 227 may transmit data indicating the state of the various components of the flow cytometer apparatus 200. For example, information read by the sensor 216 may be transmitted via the communication link(s) 227 to a separate device. Other diagnostic information indicating the integrity or health of various components of the flow cytometer apparatus 200 may be transmitted via the communication link(s) 227 to an external communication device.

In some implementations, the flow cytometer apparatus 200 may receive information at the communication link(s) 227 that is then processed by the processor(s) 218. The received information may indicate data that is accessible by the processor(s) 218 during execution of the instructions stored by the non-transitory computer readable medium 220. Further, the received information may change aspects of the controller(s) 221 that may affect the operating parameters of various components of the flow cytometer apparatus 200. In some cases, the received information may indicate a query requesting a particular piece of information (e.g., the operational state of one or more of the components of the flow cytometer apparatus 200). The processor(s) 218 may subsequently transmit the particular piece of information back out the communication link(s) 227.

In some cases, the communication link(s) 227 may include a wired connection. As such, the flow cytometer apparatus 200 may include one or more ports to interface the communication link(s) 227 to an external device. The communication link(s) 227 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, the control system 223 may communicate with other systems of the flow cytometer apparatus 200 via wired or wireless connections, and may further be configured to communicate with one or more users of system. As one possible illustration, the control system 223 may receive an input (e.g., from the sensor 216 of the flow cytometer apparatus 200) indicating a change in operational status of the flow cytometer apparatus 200. The input to control system 223 may be received via the communication link(s) 227. Based on this input, the control system 223 may perform operations to cause the flow cytometer apparatus 200 to perform one or more tasks.

Operations of the control system 223 may be carried out by the processor(s) 218. Alternatively, these operations may be carried out by the controller 221, or a combination of the processor(s) 218 and the controller 221. In some implementations, the control system 223 may partially or wholly reside on a device other than the flow cytometer apparatus 200, and therefore may at least in part control the flow cytometer apparatus 200 remotely. Communication link(s) 227 may be used at least in part to carry out the remote communication.

As described above, the flow cytometer apparatus 200 includes a processor 218 in communication with the sensor 216, and a non-transitory computer readable medium 220 having stored therein instructions that are executable to cause the processor 218 to perform functions. In particular, the functions may include (i) receiving, via the processor 218, the one or more properties of the fluid in the fluidic pathway 208 detected by the sensor 216, and (ii) determining, based on the detected one or more properties of the fluid in the fluidic pathway 208, a presence of a separation gas in the fluid in the fluidic pathway 208.

The processor 218 may transmit the separation gas detection data to a processed data channel in combination with other detector data channels, such as the scatter detector 124, the fluorescence detector 126, and/or the side scatter detector 128 as non-limiting examples. As such, the separation gas presence data may be processed and integrated with sampling protocol information as part of the well identification algorithm. The processor 218 may be configured to correct for a known time offset between a flow cell event trigger and a sensor trigger. The time offset may be adaptive based on the sample flow rate. Further, this time offset accounts for the location of the sensor 216 being ahead of the other sensors in the data stream.

In one example, the sensor 216 is coupled directly to the fluidic pathway 208. In another example, the sensor 216 is positioned adjacent the fluidic pathway 208 while not physically touching the fluidic pathway 208. The sensor 216 can be positioned between about 0.10 inches and about 48 inches from the first end 204 of the flow cell 202, between about 0.10 inches and about 24 inches from the first end 204 of the flow cell 202, between about 0.10 inches and about 12 inches from the first end 204 of the flow cell 202, between about 0.10 inches and about 6 inches from the first end 204 of the flow cell 202, between about 0.10 inches and about 4 inches from the first end 204 of the flow cell 202, or between about 0.10 inches and about 2 inches from the first end 204 of the flow cell 202. Positioning the sensor 216 closer to the flow cell 202 may provide improved accuracy with respect to separation gas detection in the fluidic pathway 208.

As shown in FIG. 10, the flow cytometer apparatus 200 may further include a pump 222 in fluid communication with the fluidic pathway 208. Although the pump 222 is shown before the flow cell 202 in FIG. 10, in another embodiment the pump 222 may be positioned downstream of the flow cell 202. In one particular example, the pump 222 comprises a peristaltic pump. One example peristaltic pump is Gilson Minipuls 3, although other example peristaltic pumps may be used. In one embodiment, such a peristaltic pump may be operated in a manner that reduces pulsatile flow, thereby improving the sample characteristics in the flow cytometer apparatus 200. In another embodiment, the pump 222 comprises a syringe pump. Further, additional pumps may be added to the flow cytometer apparatus 200 to perform various functions. For example, a combination of one or more peristaltic pumps and one or more syringe pumps may be used to transport samples through the fluidic pathway 208.

In one embodiment, the fluidic pathway 208 may be made of an elastomer tubing, such as nitrile (NBR), Hypalon, Viton, silicone, polyvinyl chloride ("PVC"), Ethylene-Propylene-Diene-Monomer ("EPDM"), EPDM+polypropylene, polyurethane or natural rubber, among other possibilities. An example of such a tube may be a polyvinyl chloride (PVC) tube having an inner diameter of about 0.01 to 0.03 inches and a wall thickness of about 0.01 to 0.03 inches. In one embodiment, a preferred tube for a fluidic pathway may be a PVC tube having an inner diameter of about 0.02 inches and a wall thickness of about 0.02 inches.

In one embodiment, the flow cytometer apparatus 200 may include an autosampler 224 coupled to the probe 214. One particular non-limiting example of an autosampler 224 that may be used with the flow cytometer apparatus 200 is the Gilson 215 liquid manager. In one embodiment, the autosampler 224 may include an adjustable arm 226. As the adjustable arm 226 of the autosampler 224 moves side to side and up and down, the probe 214 is lowered into individual sample wells 228 of a well plate 230 to obtain a sample that has been tagged with a marker particle to be analyzed using the flow cytometer apparatus 100. In turn, the probe 214 is coupled to the first end 210 of the fluidic pathway 208, and a pump 222 is in fluid communication with the fluidic pathway 208.

In operation, the probe 214 may take up a sample 229 from a sample well 228 in the well plate 230, for example, and then advance the sample 229 into the fluidic pathway 208. The pump 222 may then drive a fluid flow stream 234 including samples 229 from the well 228 through the fluidic pathway 208 to the flow cell 202. In such an embodiment, the sensor 216 is in fluid communication with the autosampler 224 via the fluidic pathway 208, and the flow cytometer apparatus 200 is configured to focus the fluid flow stream 234 delivered by the fluidic pathway 208 from the autosampler 224 and selectively analyze the particles in each of the plurality of samples 229 as the fluid flow stream 234 passes through the sensor 216 and the flow cell 202. In one embodiment, the flow cytometer apparatus 200 further includes a laser interrogation device 236 positioned downstream from the flow cell 202. The laser interrogation device 236 is configured to examine individual samples flowing from the flow cell 202 at a laser interrogation point.

As shown in FIG. 10, the fluid flow stream 234 may include a series of samples 229 each separated by a separation gas 238, such as an air bubble as a non-limiting example. The separation gas 238 may be formed by allowing probe 214 to intake air (or other gas) in between intaking sample material from each of sample wells 228. As such, the autosampler 224 and the pump 222 cooperate to introduce aliquots of the separation gas 238 between successive ones of the samples 229 in the fluid flow stream 234 to configure the fluid flow stream 234 as a separation gas-separated fluid flow stream.

The sensor 216 may take a variety of forms. In one example, the sensor 216 comprises an ultrasonic sensor. In such an example, the one or more properties of the fluid in the fluidic pathway 208 detected by the sensor 216 comprises a density of the fluid. The non-transitory computer readable medium 220 may store first density data corresponding to a range of density values for a sample, and may further store second density data corresponding to a range of density values for air. The processor 218 may compare the density measured by the ultrasonic sensor with the stored first density data and second density data to determine whether or not a separation gas is present in the fluid in the fluidic pathway 208.

In another example, the sensor 216 comprises an optical sensor. In such an example, the one or more properties of the fluid in the fluidic pathway 208 detected by the sensor 216 comprises a reflection of light through the fluidic pathway 208. In particular, the optical sensor measures the transmission of light through the tubing of the fluidic pathway 208 and looks for differences in the reflection of air compared to the reflection of the samples. As such, the non-transitory computer readable medium 220 may store first reflection data corresponding to a range of reflection values for a sample, and may further store second reflection data corresponding to a range of reflection values for air. The processor 218 may compare the reflection measured by the optical sensor with the stored first reflection data and second reflection data to determine whether or not a separation gas is present in the fluid in the fluidic pathway 208.

In another example, the sensor 216 comprises an image sensor. In such an example, the one or more properties of the fluid in the fluidic pathway 208 detected by the sensor 216 comprises an image of the fluid in the fluidic pathway 208 captured by the image sensor. The image sensor may be a camera, such as a charge coupled device (CCD) or a complementary metal-oxide-semiconductor (CMOS) sensor. The image sensor uses camera and image processing to record samples and extract information from the fluid flow stream 234. In particular, the non-transitory computer readable medium 220 may store first image data corresponding to known images of samples, and may further store second image data corresponding to known images of a separation gas. The processor 218 may compare the image data from the image sensor with the stored first image data and second image data to determine whether or not a separation gas is present in the fluid in the fluidic pathway 208.

In yet another example, the sensor 216 comprises a mass flow sensor. In such an example, the one or more properties of the fluid in the fluidic pathway 208 detected by the sensor 216 comprises a temperature of the fluid in the fluidic pathway 208. In particular, one end of the mass flow sensor may be configured to heat the sample up, and the mass flow sensor determines how much the sample cools off by the time the sample reaches the other end of the mass flow sensor. Since samples will heat and cool at a different rate than air, the difference in temperature can indicate whether or not a separation gas is present in the fluidic pathway. In particular, the non-transitory computer readable medium 220 may store first temperature data corresponding to a known temperature drop range between opposite ends of the mass flow sensor for a sample when heated at one end of the mass flow sensor. The non-transitory computer readable medium 220 may further store second temperature data corresponding to a known temperature drop range between opposite ends of the mass flow sensor for a separation gas when the separation gas is heated at one end of the mass flow sensor. The processor 218 may compare the detected temperature drop from the mass flow sensor with the stored first temperature data and second temperature data to determine whether or not a separation gas is present in the fluid in the fluidic pathway 208.

In one embodiment, the non-transitory computer readable medium 220 causes the processor 218 to further perform functions including (i) generating separation gas timing data comprising the detected one or more properties of the fluid in the fluidic pathway 208 and a corresponding timestamp, and (ii) identifying a respective sample well of the plurality of sample wells 228, based, at least in part, on the separation gas timing data, as discussed in additional detail above.

In another embodiment, the non-transitory computer readable medium 220 causes the processor 218 to further perform functions including (i) generating, with a scatter detector, a scatter voltage output signal indicative of an intensity of scattered light as the fluid passes through the flow cytometer apparatus 200 for a period of time, and (ii) sampling the scatter voltage output signal, wherein determining the presence of the separation gas in the fluid in the fluidic pathway 208 is further based at least in part on the sampled scatter voltage output signal, as discussed in additional detail above.

In another embodiment, the non-transitory computer readable medium 220 causes the processor 218 to further perform functions including recording a timestamp and a voltage value for each sampled voltage of the scatter voltage output signal that is greater than a separation gap threshold, wherein the separation gap threshold has a constant value, as discussed in additional detail above.

In another embodiment, the non-transitory computer readable medium 220 causes the processor 218 to further perform functions including (i) determining, based on the detected one or more properties of the fluid in the fluidic pathway 208, a first timestamp of a start of a sample in the fluidic pathway 208, (ii) determining, based on the detected one or more properties of the fluid in the fluidic pathway, a second timestamp of an end of a sample in the fluidic pathway 208, and (iii) determining, based at least in part on the first timestamp, the second timestamp, a flow rate of the fluid in the fluidic pathway 208, and a diameter of the fluidic pathway, a volume of the sample.

In another embodiment, the non-transitory computer readable medium 220 causes the processor 218 to further perform functions including determining, based on the detected one or more properties of the fluid in the fluidic pathway 208, a presence of marker particles in the fluid in the fluidic pathway 208. In one example, the presence of marker particles in the fluid in the fluidic pathway 208 may be indicated by physical or chemical features, such as fluorescent intensity of the samples. The presence of marker particles in the fluid in the fluidic pathway 208 may be used to determine the boundary of the samples in the fluidic pathway 208. In addition, this marker particle data may provide for comparing the relative fluorescence of fluorescent marker particles to treated cells as a consistency parameter for samples obtained from wells within a plate or plates for a flowing stream of samples in an experiment recorded in a single data file. Thus, data obtained from multiple plates can be normalized to the marker particles, allowing direct comparison of results over large experimental data sets.

In another embodiment, the non-transitory computer readable medium 220 causes the processor 218 to further perform functions including (i) determining, based on the detected one or more properties of the fluid in the fluidic pathway 208 over a time period, a count of a number of detected separation gas bubbles in the fluid in the fluidic pathway 208, and if the count is below a minimum count tolerance, then determining that the flow cytometer apparatus 200 has a clog. In one embodiment, the count tolerance may be a minimum of fifteen detected separation gas bubbles per second. Other count tolerances are possible as well.

Figure 11:
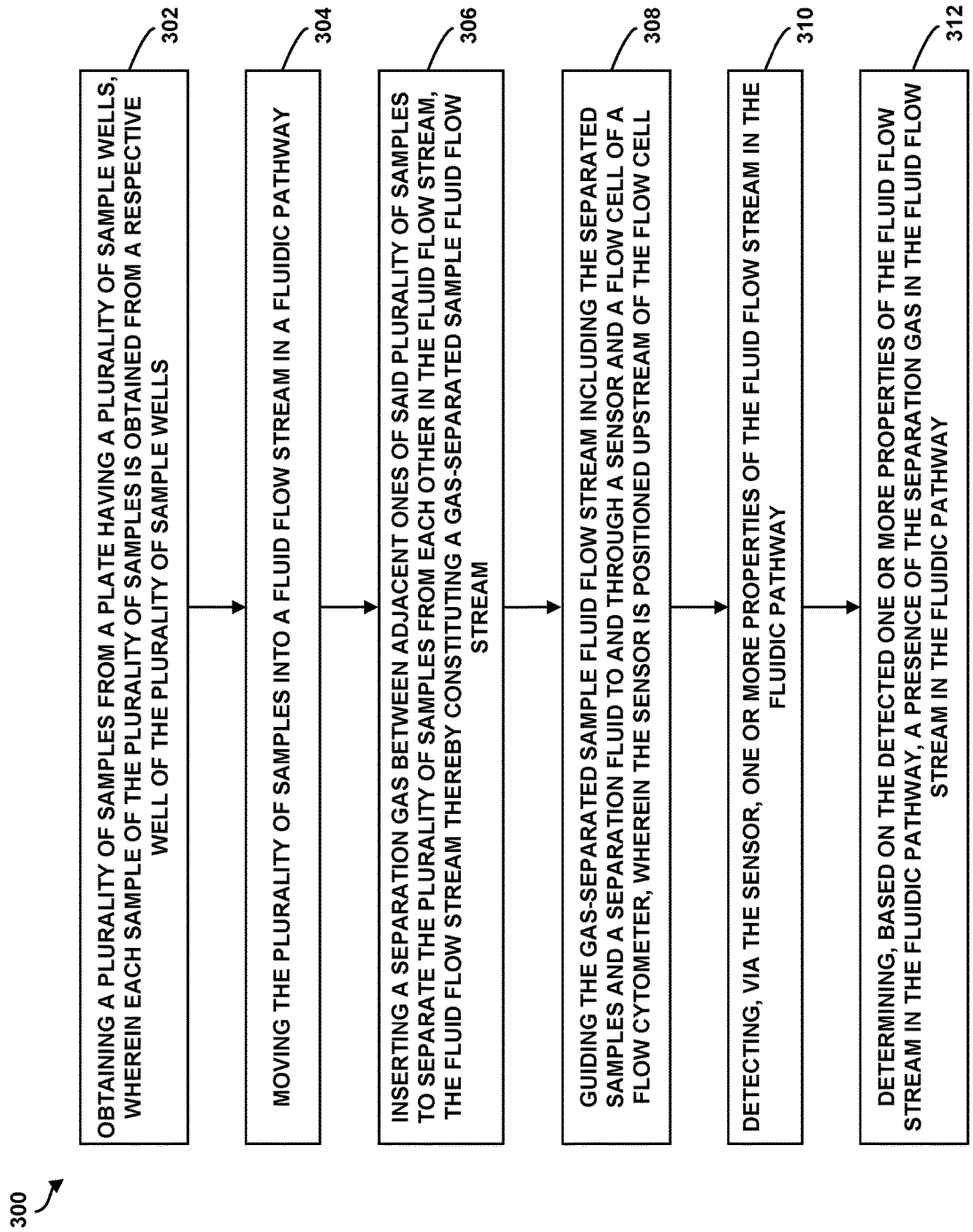
FIG. 11 illustrates a flow chart of a method for detecting a separation gas in a fluid flow stream, according to one example embodiment.

FIG. 11 is a flowchart of a method for detecting a separation gas in a fluid flow stream, according to example implementations. The implementations may be carried out by the flow cytometer apparatus 200 as described above in relation to FIG. 10. Method 300 may include one or more operations, functions, or actions as illustrated by one or more of blocks 302-312. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other procedures and operations disclosed herein, the block diagram illustrates a possible implementation. In this regard, each block may represent a module, a segment, or a portion of program code, which includes one or more instructions executable by a processor or computing device for implementing specific logical operations. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, each block in FIG. 11 may represent circuitry that is wired to perform the specific logical operations.

At block 302, the method 300 includes obtaining a plurality of samples from a plate having a plurality of sample wells, wherein each sample of the plurality of samples is obtained from a respective well of the plurality of sample wells. At block 304, the method 300 includes moving the plurality of samples into a fluid flow stream in a fluidic pathway. At block 306, the method 300 includes inserting a separation gas between adjacent ones of said plurality of samples to separate the plurality of samples from each other in the fluid flow stream, the fluid flow stream thereby constituting a separation gas-separated sample fluid flow stream. At block 308, the method 300 guiding the gas-separated sample fluid flow stream including the separated samples and a separation fluid to and through a sensor and a flow cell of a flow cytometer, wherein the sensor is positioned upstream of the flow cell. At block 310, the method 300 includes detecting, via the sensor, one or more properties of the fluid flow stream in the fluidic pathway. At block 312, the method 300 includes determining, based on the detected one or more properties of the fluid flow stream in the fluidic pathway, a presence of the separation gas in the fluid flow stream in the fluidic pathway.

In one example, as discussed above in relation to FIG. 10 above, the plurality of samples are obtained from the plate having the plurality of sample wells via an autosampler coupled to a probe. Further, as discussed above in relation to FIG. 10 above, the sensor may comprise one or more of an ultrasonic sensor, an optical sensor, an image sensor, and a mass flow sensor.

In another example, the method 300 further includes (i) generating separation gas timing data comprising the detected one or more properties of the fluid flow stream in the fluidic pathway and a corresponding timestamp, and (ii) identifying a respective sample well of the plurality of sample wells, based, at least in part, on the separation gas timing data.

In yet another example, the method 300 further includes (i) generating, with a scatter detector, a scatter voltage output signal indicative of an intensity of scattered light as the fluid flow stream passes through the flow cytometer for a period of time, (ii) sampling the scatter voltage output signal, and (iii) recording a timestamp and a voltage value for each sampled voltage of the scatter voltage output signal that is greater than a separation gap threshold, wherein the separation gap threshold has a constant value.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

I claim:

1. A flow cytometer apparatus, comprising:
   a flow cell having a first end and a second end;
   a fluidic pathway having a first end and a second end, wherein the second end of the fluidic pathway is coupled to the first end of the flow cell;
   a probe coupled to the first end of the fluidic pathway, wherein the probe obtains a plurality of samples from a plurality of respective sample wells to thereby position the plurality of samples into a fluid in the fluidic pathway, and wherein the probe inserts a separation gas bubble between adjacent ones of said plurality of samples to separate the plurality of samples from each other in the fluidic pathway;
   a sensor positioned between the probe and the first end of the flow cell, wherein the sensor is configured to detect one or more properties of the fluid in the fluidic pathway;
   a processor in communication with the sensor; and
   a non-transitory computer readable medium having stored therein instructions that are executable to cause the processor to perform functions when using the apparatus, including:
      receiving, via the processor, the one or more properties of the fluid in the fluidic pathway detected by the sensor;
      determining, based on the detected one or more properties of the fluid in the fluidic pathway over a time period, a count of a number of detected separation gas bubbles in the fluid in the fluidic pathway;
      if the count is below a minimum count tolerance, then determining that the flow cytometer apparatus has a clog; and
      if the count is at or above the minimum count tolerance, then determining that the flow cytometer apparatus does not have a clog.

2. The flow cytometer apparatus of claim 1, wherein the sensor is coupled to the fluidic pathway.

3. The flow cytometer apparatus of claim 1, wherein the sensor is positioned between about 0.10 inches and about 48 inches from the first end of the flow cell.

4. The flow cytometer apparatus of claim 1, wherein the sensor comprises an ultrasonic sensor, and wherein the one or more properties of the fluid in the fluidic pathway detected by the sensor comprises a density of the fluid.

5. The flow cytometer apparatus of claim 1, wherein the sensor comprises an optical sensor, and wherein the one or more properties of the fluid in the fluidic pathway detected by the sensor comprises a reflection of light through the fluidic pathway.

6. The flow cytometer apparatus of claim 1, wherein the sensor comprises an image sensor, wherein the one or more properties of the fluid in the fluidic pathway detected by the sensor comprises an image of the fluid in the fluidic pathway captured by the image sensor.

7. The flow cytometer apparatus of claim 1, wherein the sensor comprises a mass flow sensor, wherein the one or more properties of the fluid in the fluidic pathway detected by the sensor comprises a temperature of the fluid in the fluidic pathway.

8. The flow cytometer apparatus of claim 1, further comprising:
   a pump in fluid communication with the fluidic pathway.

9. The flow cytometer apparatus of claim 1, further comprising:
   an autosampler coupled to the probe, wherein the autosampler is configured to insert the plurality of samples comprising particles from the plurality of respective sample wells into the fluid in the fluidic pathway.

10. The flow cytometer apparatus of claim 9, wherein the autosampler includes an adjustable arm.

11. The flow cytometer apparatus claim 9, wherein the sensor is in fluid communication with the autosampler via the fluidic pathway, and wherein the flow cytometer apparatus is configured to focus a fluid flow stream delivered by the fluidic pathway from the autosampler and selectively analyze the particles in each of the plurality of samples as the fluid flow stream passes through the sensor and the flow cell.

12. The flow cytometer apparatus of claim 11 wherein the autosampler and a pump cooperate to introduce aliquots of the separation fluid gas bubble between successive ones of the samples in the fluid flow stream to configure the fluid flow stream as a separation gas bubble-separated fluid flow stream.

13. The flow cytometer apparatus of claim 1, further comprising:
   a laser interrogation device positioned downstream from the flow cell, wherein the laser interrogation device is configured to examine individual samples flowing from the flow cell at a laser interrogation point.

14. The flow cytometer apparatus of claim 1, wherein the non-transitory computer readable medium causes the processor to further perform functions including:
   generating separation gas bubble timing data comprising the detected one or more properties of the fluid in the fluidic pathway and a corresponding timestamp; and
   identifying a respective sample well of the plurality of sample wells, based, at least in part, on the separation gas bubble timing data.

15. The flow cytometer apparatus of claim 1, wherein the non-transitory computer readable medium causes the processor to further perform functions including:
   generating, with a scatter detector, a scatter voltage output signal indicative of an intensity of scattered light as the fluid passes through the flow cytometer apparatus for a period of time; and
   sampling the scatter voltage output signal, wherein determining the presence of the separation gas bubble in the fluid in the fluidic pathway is further based at least in part on the sampled scatter voltage output signal.

16. The flow cytometer apparatus of claim 15, wherein the non-transitory computer readable medium causes the processor to further perform functions including:
recording a timestamp and a voltage value for each sampled voltage of the scatter voltage output signal that is greater than a separation gap threshold, wherein the separation gap threshold has a constant value.

17. The flow cytometer apparatus of claim 1, wherein the non-transitory computer readable medium causes the processor to further perform functions including:
determining, based on the detected one or more properties of the fluid in the fluidic pathway, a first timestamp of a start of a sample in the fluidic pathway;
determining, based on the detected one or more properties of the fluid in the fluidic pathway, a second timestamp of an end of a sample in the fluidic pathway; and
determining, based at least in part on the first timestamp, the second timestamp, a flow rate of the fluid in the fluidic pathway, and a diameter of the fluidic pathway, a volume of the sample.

18. The flow cytometer apparatus of claim 1, wherein the non-transitory computer readable medium causes the processor to further perform functions including:
determining, based on the detected one or more properties of the fluid in the fluidic pathway, a presence of marker particles in the fluid in the fluidic pathway.

19. The flow cytometer apparatus of claim 1, wherein the minimum count tolerance comprises a minimum of fifteen detected separation gas bubbles per second.

20. The flow cytometer apparatus of claim 1, wherein the non-transitory computer readable medium causes the processor to further perform functions including:
determining a time offset between a flow cell event trigger and a sensor trigger, wherein the time offset is based on one or more of a sample flow rate and a location of the sensor.

21. A method for detecting a separation gas bubble in a fluid flow stream comprising:
obtaining a plurality of samples from a plate having a plurality of sample wells, wherein each sample of the plurality of samples is obtained from a respective well of the plurality of sample wells;
moving the plurality of samples into a fluid flow stream in a fluidic pathway;
inserting a separation gas bubble between adjacent ones of said plurality of samples to separate the plurality of samples from each other in the fluid flow stream, the fluid flow stream thereby constituting a separation gas bubble-separated sample fluid flow stream;
guiding the separation gas bubble-separated sample fluid flow stream including the separated samples and a separation fluid to and through a sensor and a flow cell of a flow cytometer, wherein the sensor is positioned upstream of the flow cell;
detecting, via the sensor, one or more properties of the fluid flow stream in the fluidic pathway;
determining, based on the detected one or more properties of the fluid in the fluidic pathway over a time period, a count of a number of detected separation gas bubbles in the fluid in the fluidic pathway;
if the count is below a minimum count tolerance, then determining that the fluidic pathway has a clog; and
if the count is at or above the minimum count tolerance, then determining that the fluidic pathway does not have a clog.

22. The method of claim 21, wherein plurality of samples are obtained from the plate having the plurality of sample wells via an autosampler coupled to a probe.

23. The method of claim 21, further comprising:
generating separation gas bubble timing data comprising the detected one or more properties of the fluid flow stream in the fluidic pathway and a corresponding timestamp; and
identifying a respective sample well of the plurality of sample wells, based, at least in part, on the separation gas bubble timing data.

24. The method of claim 21, further comprising:
generating, with a scatter detector, a scatter voltage output signal indicative of an intensity of scattered light as the fluid flow stream passes through the flow cytometer for a period of time;
sampling the scatter voltage output signal; and
recording a timestamp and a voltage value for each sampled voltage of the scatter voltage output signal that is greater than a separation gap threshold, wherein the separation gap threshold has a constant value.

25. The method of claim 21, wherein the sensor comprises one or more of an ultrasonic sensor, an optical sensor, an image sensor, and a mass flow sensor.

26. A method for detecting a separation gas bubble in a fluid flow stream comprising:
obtaining a plurality of samples from a plate having a plurality of sample wells, wherein each sample of the plurality of samples is obtained from a respective well of the plurality of sample wells;
moving the plurality of samples into a fluid flow stream in a fluidic pathway;
inserting a separation gas bubble between adjacent ones of said plurality of samples to separate the plurality of samples from each other in the fluid flow stream, the fluid flow stream thereby constituting a separation gas bubble-separated sample fluid flow stream;
guiding the separation gas bubble-separated sample fluid flow stream including the separated samples and a separation fluid to and through a sensor and a flow cell of a flow cytometer, wherein the sensor is positioned upstream of the flow cell;
detecting, via the sensor, one or more properties of the fluid flow stream in the fluidic pathway;
generating separation gas bubble timing data comprising the detected one or more properties of the fluid flow stream in the fluidic pathway and a corresponding timestamp; and
identifying a respective sample well of the plurality of sample wells, based, at least in part, on the separation gas bubble timing data.

* * * * *